United States Patent [19]

Murray et al.

[11] Patent Number: 4,899,363
[45] Date of Patent: Feb. 6, 1990

[54] GAS BEARINGS FOR GAS LASERS

[75] Inventors: Gordon A. Murray, Carlsbad; Robert A. Golobic; Stephan G. Derrickson, both of Colorado Springs, all of Colo.

[73] Assignee: The Spectranetics Corporation, Colorado Springs, Colo.

[21] Appl. No.: 301,870

[22] Filed: May 26, 1988

Related U.S. Application Data

[63] Continuation of Ser. No. 76,906, Jul. 23, 1987, abandoned.

[51] Int. Cl.[4] ................................................. H01S 3/03
[52] U.S. Cl. .......................................... 372/65; 372/37; 372/58
[58] Field of Search .................. 372/61, 65, 55, 58, 372/59, 37; 373/96, 98

[56] References Cited

U.S. PATENT DOCUMENTS

| 4,096,449 | 7/1978 | Foster | 372/58 |
| 4,099,143 | 7/1978 | Foster | 372/58 |
| 4,245,194 | 1/1981 | Fahlen et al. | 372/58 |
| 4,567,597 | 1/1986 | Mandella | 372/61 |

FOREIGN PATENT DOCUMENTS

| 0065761 | 12/1982 | European Pat. Off. . |
| 3600124 | 7/1987 | Fed. Rep. of Germany . |
| 2135815 | 9/1984 | United Kingdom . |
| 2176848 | 1/1987 | United Kingdom . |
| 2184595 | 6/1987 | United Kingdom . |

*Primary Examiner*—Léon Scott, Jr.
*Attorney, Agent, or Firm*—Cushman, Darby & Cushman

[57] ABSTRACT

An improved drive coupling and bearing assembly for a recirculation fan in a long-life gas laser unit includes a plurality of frictionless gas bearings which allow journals supporting the recirculation fan to ride on a cushion of compressed laser gas. Mechanical power is transmitted from an external source to the recirculation fan through a magnetic coupling assembly, so that the walls of the sealed laser unit do not have to be breached. Additional structure is provided for spacing the driven magnet in the magnetic coupling assembly from the interior wall of the long-life laser unit.

16 Claims, 3 Drawing Sheets

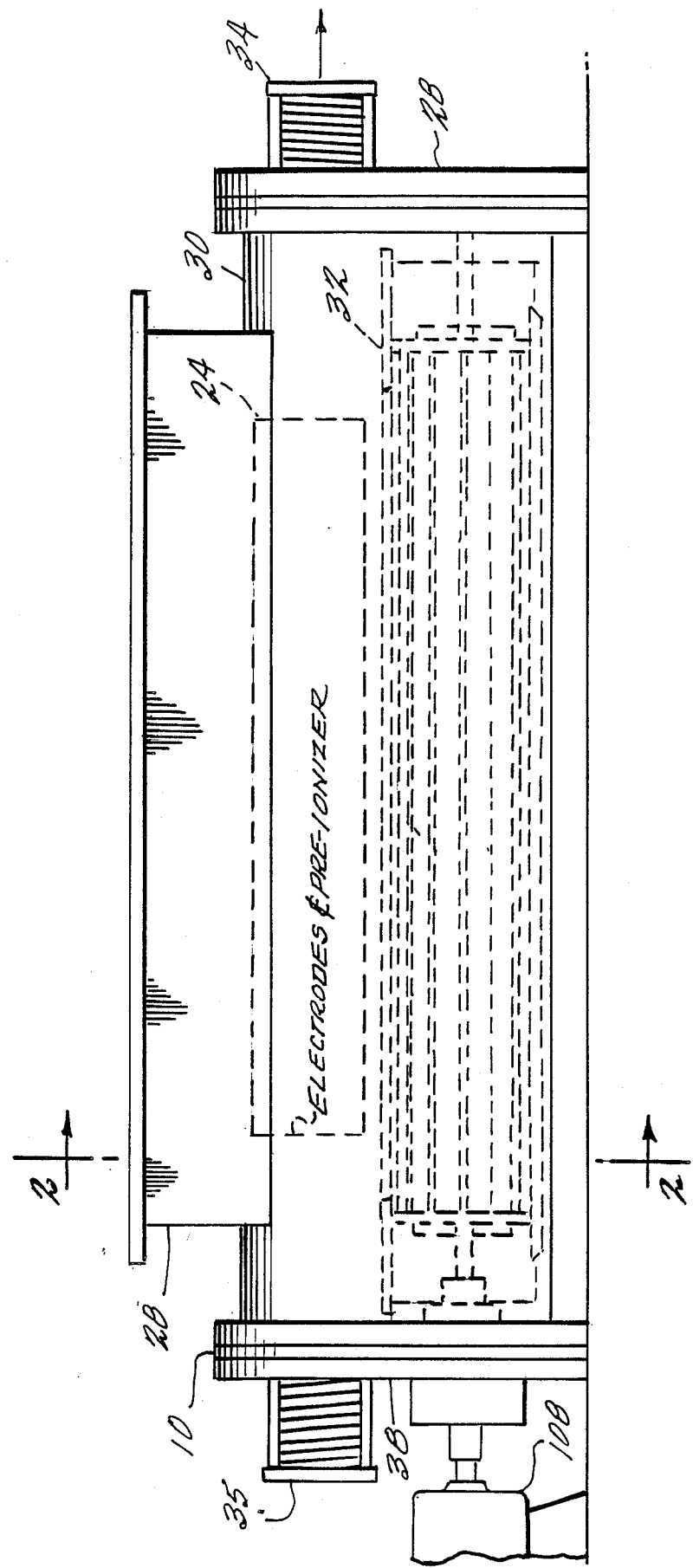

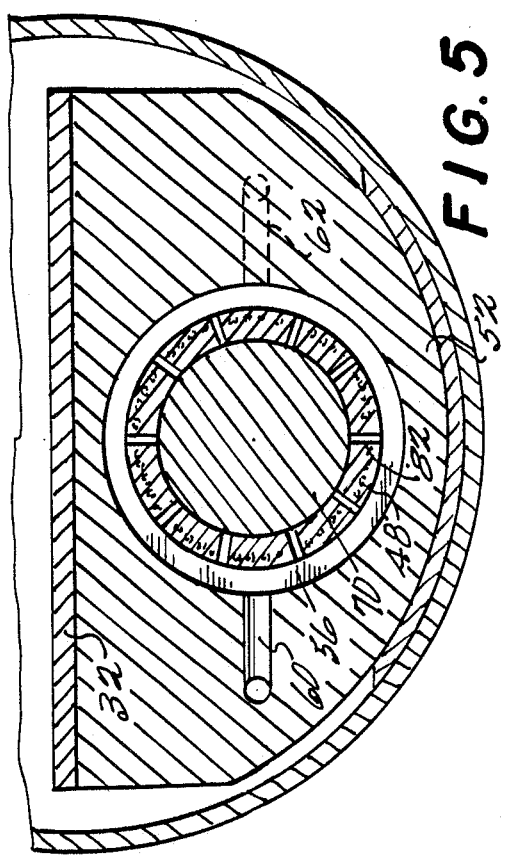

GAS BEARINGS FOR GAS LASERS

This is a continuation of application Ser. No. 076,906, filed July 23, 1987 now abandoned.

BACKGROUND OF THE INVENTION

1. Field of the Invention

The present invention relates to an improved mechanism for circulating gases in a laser.. More particularly, the present invention relates to an improved drive coupling and bearing assembly for a circulation fan in a long-life excimer type laser.

2. Description of the Prior Art

Transverse electric (atmospheric) discharge lasers, or TE (A) lasers, have an electric discharge transverse to the lasing optical axis. Transverse electric lasers may operate in a pulse mode, with the laser pulse length generally depending upon the type of active laser gas that is used therein. Many types of different gases, for example carbon dioxide, may be used in such lasers, the wave length of the laser output depending upon the type of gas that is being used.

In order to operate these types of lasers at more than a few pulses per second, the laser gas that is being used must be circulated through the discharge region in order to disperse the heat and molecular by-products that are produced by the laser. In the past, rotary fans or axial compressors have been used to circulate the gas, allowing the lasers to operate up to about 1,000 pulses per second. Conventional rotary mechanical bearings have been used to support the fans or compressors of such prior art devices, as may be seen in U.S. Pat. No. 4,099,143 to Foster.

However, conventional bearings have several problems when used in transverse electric discharge lasers, which limit the useful life of the laser. These problems are concerned with the interaction between the bearings and the active laser gas, and with the vacuum "processing" of the laser in its final stage of manufacture.

Generally, the final manufacturing step for sealed lasers, as with light bulbs or television picture tubes and other long-life products, involves a high temperature vacuum bake out. This procedure ensures that contaminants are removed from the walls of the containment vessel, and that the long term makeup of the laser gas will not be altered by contaminants that had previously been adsorbed by the walls of the containment vessel. In this way, the useful life of the laser may be extended by factors of hundreds.

However, when conventional lubricated ball bearings are used to support the circulation fan in the long-life laser, the laser assembly cannot practically be subjected to the high temperature baking out process during manufacture, since the lubricating fluid in the bearings will be burned off during the baking process, contaminating the internal surfaces of the laser. Moreover, the bearings will be left without any lubrication and will quickly seize during operation of the circulating fan.

Clearly, there is a long and unfilled need in the prior art for a bearing that can be used in a long-life laser assembly that can be subjected to the bake out process without damage and without contaminating the laser gas.

A similar problem exists in transmitting mechanical energy to the circulation fan in a sealed laser assembly. In the prior art, the drive shaft was commonly extended through an opening in the laser housing for connection with the fan or compressor, as may be seen in U.S. Pat. Nos. 4,571,730 to Mizoguchi et al, 4,624,001 to Gurs, 4,627,061 to McLeod et al, 3,735,284 to Hill and 3,302,127 to Lin.

Lin Discloses the use of nylon material and O-rings with the bearing at the point a shaft passes through the housing wall. Mizoguchi et al teach the use of a magnetic fluid seal. In order to seal the opening, conventional sealing joints such as that disclosed in Mizoguchi et al were used. However, the sealing joints needed lubrication, and such joints commonly used polymeric gaskets in order to prevent mixing of outside layer air with the laser gases. This further reduced the shelf life of the laser, since those materials can not withstand the high temperatures in vacuum that are used in the baking out process without contaminating the inside of the sealed laser assembly.

Another prior art arrangement for driving the fan is illustrated in U.S. Pat. No. 4,099,143 to Foster. A drive motor is included within the housing, and is thus subjected to the high temperatures and caustic gasses within the housing. In addition, it is doubtful whether such a drive motor could survive the high temperature vacuum bake out process without sustaining damage.

Clearly, a coupling arrangement is needed that can survive the baking out process, and will not contaminate the inside of the laser prior to its use.

SUMMARY OF THE INVENTION

An object of the present invention is to provide a bearing for a recirculation fan in a long-life gas discharge laser that can survive the baking out process without contaminating the laser gas.

A further object of the present invention is to provide a coupling arrangement whereby mechanical energy can be transferred from the exterior of the laser assembly to the recirculation fan, without compromising the sealing of the laser, and which can survive the baking out process without contaminating the laser gas.

The foregoing objectives are achieved in the present invention by the provision of first and second gas bearings for supporting the circulation fan on a cushion of compressed gas, and by a magnetic coupling assembly for coupling the fan to an external drive shaft without penetrating the walls of the sealed laser assembly. The gas bearings run on the active laser gas itself, and require no lubrication except for the laser gas, and can thus be baked at very high temperatures to remove contamination from the laser, without sustaining any damage.

Since these bearings can survive the baking out process, it is anticipated that a laser constructed according to the present invention will be able to operate for more than one hundred million pulses, and have a shelf life of one year. The gas bearings further increase the life time of the laser because the bearings themselves exhibit much less wear than a conventional lubricated bearing, because there is only one moving part and no mechanical contact between the rotary and stationary parts.

Moreover, the gas bearings allow the fan to circulate at greater speeds for a given power input, because of the decreased resistance of the bearings, this permitting greater gas circulation.

In addition, the gas bearings suffer no degradation in performance after being used, returned to exposure to atmospheric air, and subsequently being sealed in the laser gas. Many prior art lubricated bearings would seize up after such a duty cycle, or show much more rapid wear due to corrosion of the metallic bearing surfaces.

Power to the circulating fan is delivered by means of a magnetic coupling through the laser body. The magnetic coupling of the present invention includes a driven magnet that is driven by an exterior power source and is positioned adjacent to the interior of the laser housing opposite the driving magnet. The use of a magnetic coupling eliminates the need for a rotating seal to transmit power to the circulating fan. The attractive force of the magnets is balanced by the gas bearing assembly. The gas bearing design provides for gas pressure within the bearing in an axial direction opposing the magnetic attraction. The driven magnet coupler is thus supported displaced from the laser housing free to rotate. The gas bearing provides, not only radial support for the shaft of the fan, but axial support for the magnetic coupling as well. Since no seals and no lubricants other than the laser gas are used throughout, the coupling may be used in conjunction with the baking out process, permitting a longer useful life for the laser.

Other objects, features and advantages of the present invention will become more apparent in the light of the following detailed descriptions of preferred embodiments thereof as illustrated in the accompanying drawings, wherein like reference numerals designate corresponding structure.

BRIEF DESCRIPTION OF THE DRAWINGS

FIG. 1 is a schematic side plan view of a long-life laser assembly constructed according to the present invention;

FIG. 3 is sectional view through a long-life laser recirculation fan coupling and support assembly constructed according to the present invention;

FIG. 4 is a cross sectional view taken along lines 4—4 in FIG. 3; and

FIG. 5 is a cross sectional view taken along lines 5—5 in FIG. 3.

DETAILED DESCRIPTION OF THE PREFERRED EMBODIMENT

Figure 2:
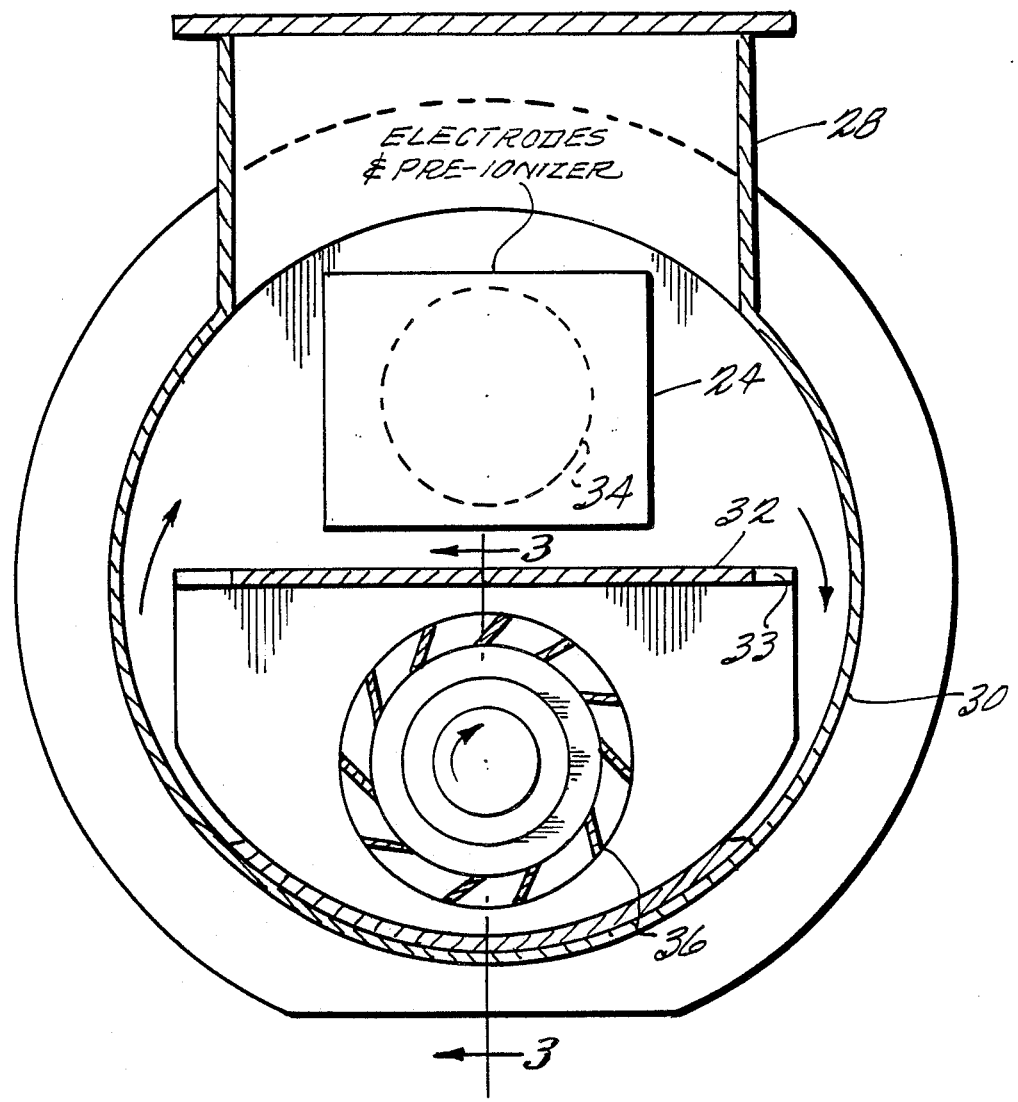
FIG. 2 is a schematic cross sectional view taken along lines 2—2 in FIG. 1.

Referring now to the drawings, FIGS. 1 and 2 illustrate a long-life excimer laser system constructed according to the present invention. Laser 10 is separated into an upper housing 28 and a lower housing 30. Located in housings 28 and 30 are electrodes and a means of pre-ionization 24 arranged in a conventional manner well known to those skilled in the art. The upper housing provides for insulation between the upper electrode and lower electrode. The upper housing also provides feed-throughs and insulation for the pre-ionizers. Ceramic insulation is used in lieu of plastic so as to be bakeable and not react with the laser gas.

In order to circulate the gas in the region of electrode assembly 24, a squirrel cage type gas circulation fan 36 is provided within lower housing 30. Squirrel cage fan 36 is supported for rotation within the plenum chamber housing by a pair of bearings 45, 47 which are supported by first and second bulkheads 50, 52, respectively, which are connected to a connecting plate (see FIG. 3) 32. First bearing 45 is designed as a radial support bearing. Second bearing 47 is designed as both a radial support bearing and an axial thrust bearing, as will be subsequently described.

Each of first and second bearings 45, 47 have an outer bearing sleeve member 46, 48 and a journal member 68, 70, respectively, mounted for rotation therein (see FIGS. 4 and 5). Journal members 68, 70 are designed to have an outer diameter that is slightly less than the inner diameter of outer sleeves 46, 48 so that journal members 68, 70 can be separated from the outer sleeves by a thin cushion of compressed gas that is supplied therebetween.

In order to provide the thin cushion of compressed gas on which the journal members 68, 70 ride, gas from housings 28 and 30 is sucked into a passage 84 past a filter 86 through an additional passage 88 into a compressor 90. Compressor 90 then pumps the gas at an increased pressure into a passage 92 that connects to a first conduit 58 in first bulk head 50, a second conduit 60 in second bulk head 52 and a third conduit 62 in second bulk head 52.

As shown in FIG. 4, first conduit 58 connects with an annular recess 54 in first bulkhead 50. Annular recess 54 in turn communicates with a plurality of radially extending air hole bores 80 in first bearing 46. Similarly, second conduit 60 connects with an annular recess 56 in second bulk head 52, which in turn communicates with a plurality of radially extending air hole bores 2 in second bearing 48.

In this way, pressurized gas from the compressor 90 is forced between first sleeve 46 and first journal 68, and between second sleeve 48 and second journal 70, so that the journals ride frictionlessly on a thin cushion of compressed gas.

Mechanical energy is supplied to the squirrel cage fan 36 by a drive shaft 94 that is connected to an external drive motor 108, as shown in FIG. 1. As illustrated in FIG. 3, the energy from shaft 94 is transferred to the squirrel cage fan 36 by a magnetic coupler arrangement 112. The magnetic coupler arrangement consists of a drive magnet holder 96 that is connected to the drive shaft 94 and holds a drive magnet 98 therein. The drive magnet holder 96 is kept positioned adjacent the exterior of one of end flanges 38 of the plenum chamber housing 30 by a drive magnet retainer member 110.

Driven magnet holder 100 with a driven magnet 102 mounted therein is positioned opposite the driving magnet 98 in a recess 104 that is provided in the inner surface of end flange 38. Driven magnet holder 100 is in turn coupled to an extension 106 of journal 68. Jigs 42 are connected to opposite ends of fan 36 and are in turn coupled to journals 68 and 70 by set screws 44. Jigs 42 do not extend across the squirrel cage fan 36. In this way, squirrel cage fan 36 remains flexible, allowing the bearings to be self-aligning.

In order to keep driven magnet 102 from bearing against end flange 38 of the plenum chamber housing 30, means are provided for frictionlessly spacing the driven magnet from end flange 38. In the preferred embodiment, second journal member 70 is provided with an outwardly extending flange portion 72, as shown in FIG. 3. Gas supplied from compressor 90 is introduced into an annular chamber formed by a second annular recess 64 in second bulkhead 52 and an aligned annular recess 66 in second bearing 70. The gas is then expelled through a plurality of axially extending air hole bores 74 in second bearing 48, so as to create a thin cushion of compressed gas between end surface 76 of the second bearing and inner surface 78 of the flange portion 72 of second journal 70, as shown in FIG. 3. In this way, a spacing is maintained between the wall of end flange 38 of the plenum chamber housing and driven magnet 102.

A sealed laser assembly according to the present invention is constructed as follows. The housing is first placed in a vacuum and baked at a temperature of approximately 350° Celsius in order to remove any impurities previously adsorbed by the walls of the housing. The housing is then sealed, and filled with the desired mixture of laser gas. A suitable source of electric potential is then added.

The operation of a long-life laser constructed according to the present invention will now be described, particularly in regard to a xenon chloride type excimer laser, which produces a laser beam at 308 nanometers. After assembly of the laser unit, a mixture of 5 gases is introduced into housings 28 and 30, specifically approximately 65.8 percent neon, 31.6 percent helium, 2.4 percent xenon, 0.2 percent hydrogen chloride and a trace of hydrogen. Laser 10 is filled with the gas mixture to an absolute pressure of 2100 torr. A power supply then charges capacitors, which are connected to electrodes and pre-ionizers 24. The capacitors are discharged in a manner well known in the art to ionize the gas, dissociating the hydrogen chloride and ionizing the neon and helium.

The high pressure and high temperature conditions created in the discharge along with the dissociation and ionization cause a unique molecule, xenon chloride, to form for an extremely short period. This molecule only exists in the excited state; it is a polymer of two atoms, in other words a dimer, hence the contraction excimer, which stands for "excited dimer". This molecule then emits radiation at a wave length of 308 nanometers.

The emitted radiation then builds in intensity in the direction of the electrode axes by being continuously reflected (resonating) between mirror 35 and output coupler 34 that is shown in FIGS. 1 and 2. A pulse of laser energy is eventually emitted through output coupler 34.

After the xenon chloride molecule has emitted radiation, it returns to the ground state, quickly dissociates, reforming hydrogen chloride. The trace amount of hydrogen present in the mixture results in an excess of hydrogen, thereby promoting the recombination of hydrogen chloride and minimizing the formation of the chlorine molecule. Chlorine molecules are undesirable because they absorb radiation at 308 nanometers, thereby reducing the efficiency of the laser.

In order to dilute unwanted chlorine molecules that are formed during the discharge process, and to dissipate unwanted heat, the squirrel cage fan is caused to be turned by applying power to drive motor 108 during the laser operation. This causes gas to be circulated in housings 28 and 30 and through passages 33 (see FIG. 3) which are defined between platform 32 and housing 30. At this time, laser gas is forced between the outer bearing sleeves 46, 48 and the journals rotatably mounted therein. The journals members and squirrel cage fan thus ride frictionlessly on a cushion of laser gas.

At the same time, particulate matter that is generated by degradation of the electrodes and pre-ionizers during the discharge process are filtered out from the laser gas by filter 86 in the compressor circuit. The shelf life and efficiency of the laser is thus further extended.

While the invention has been particularly shown and described with reference to the illustrated embodiment, it should be understood that various changes in the form, detail and application of the present invention may be made by those skilled in the art without departing from the spirit and scope of the invention. For example, journal member 68 may include a thrust bearing also, so as to be identical to journal member 70. Also, jig 42 can be eliminated when fan 36 is directly coupled to journal members 68 and 70.

All such modifications are intended to be within the scope of this invention as defined by the following claims.

We claim:

1. A long-life transverse electric discharge laser assembly comprising:
   a housing for containing an excimer laser gas;
   means for electrically exciting said laser gas within said housing;
   means for circulating the laser gas within said housing; and gas bearings including
   means for supporting said circulating means on a cushion of laser gas to reduce friction and to allow baking of said housing at high temperatures, which baking enables the laser to operate for extended periods.

2. Apparatus according to claim 1, wherein said gas bearings comprises first and second gas bearings for supporting said circulation means for rotation in said housing, and means for supplying compressed laser gas to said first and second gas bearings.

3. Apparatus according to claim 2, wherein said supplying means comprises a first passage; a filter member disposed in said first passage, a compressor for drawing gas from said housing through said first passage and said filter and a second passage for transporting the gas to said first and second gas bearings.

4. Apparatus acording to claim 3, further comprising first and second journal members integrally connected with said circulating means and mounted for rotation within said first and second gas-bearing means, respectively; a platform mounted within said housing; first and second bulkhead means suspended from said platform for supporting said first and second gas bearings, said first and second bulkhead means having annular recesses defined therein commnicating with said second passage, said first and second gas bearings each having a plurality of radially extending air hole bores defined therein for communicating with said anular recesses in said first and second bulkhead means, respectively, whereby a cushion of gas from said supplying means may be provided between said gas bearings and said journals, respectively.

5. Apparatus according to claim 4, wherein said circulating means is a squirrel-cage type fan.

6. Apparatus according to claim 1, wherein said circulating means is a squirrel-cage type fan.

7. A long-life transverse electric discharge laser assembly comprising:
   a housing for sealedly holding an excimer laser gas;
   means for electrically exciting said laser gas within said housing;
   means for circulating the laser gas within said housing; and gas bearings including
   means for supporting said circulating means on a cushion of laser gas to reduce friction and to allow baking of said housing at high temperatures, which baking enables the laser to operate for extended periods; and
   means for coupling said circulating means to a source of mechanical power external to said housing without breaching sad housing.

8. Apparatus according to claim 7, wherein said coupling means comprises:
- a driving magnet positioned adjacent an outer surface of said housing and connected to the external source of mechanical power; and
- a driven magnet positioned adjacent an inner surface of said housing opposite said driving magnet and connected to said circulating means.

9. Apparatus according to claim 8, wherein said supporting means includes first and second gas bearings for supporting said circulating means, and means for supplying compressed laser gas to said first and second laser gas bearings, whereby said circulating means turns on a cushion of compressed gas.

10. Apparatus according to claim 9, further comprising means for spacing said driven magnet from said inner surface of said housing.

11. Apparatus according to claim 10, wherein at least one of said gas bearing is a thrust bearing including an outer sleeve portion and an inner journal portion having a flange at one end thereof, said journal portion being connected with said driven magnet, and wherein said spacing means comprise second means for supplying compressed laser gas between an end surface of said sleeve portion and an inner surface of said flange portion, whereby said inner surface and said end surface are separated by a cushion of gas.

12. Apparatus according to claim 7, wherein said supporting means includes first and second gas bearings for supporting said circulating means, and means for supplying compressed laser gas to said first and second gas bearings, whereby said circulating means turns on a cushion of compressed gas.

13. Apparatus according to claim 12, wherein said supplying means comprises a first passage, a compressor for drawing gas from said housing through said first passage, a second passage for transporting the gas to said first and second gas bearings and a filter member disposed in one of said first and second passages.

14. Apparatus according to claim 13, wherein said first and second bearings comprise:
- first and second outer sleeve portions, respectively;
- first and second journal members connected with said circulating means and mounted for rotation within said first and second sleeve portions, respectively;
- a platform mounted within said housing; first bulkhead means suspended from said platform for supporting said first gas bearing and; second bulkhead means suspended from said platform for supporting said second gas bearing, said first and second bulkhead means having annular recesses defined therein communicating with said second passage, said first and second outer sleeves each having a plurality of radially extending airhole bores defined therein for communicating with said annular recesses in said first and second bulkhead means, respectively, whereby a cushion of gas from said supplying means is provided between said outer sleeves and said journal member respectively.

15. A method of manufacturing a long-life transverse electric discharge laser assembly comprising:
 (a) providing a sealable housing having electrodes, a mirror assembly, a laser gas circulation fan and a plurality of gas bearings for supporting the circulation fan therein;
 (b) evacuating the air out of said housing;
 (c) baking the housing to remove contaminants from the walls thereof;
 (d) filling said housing with a selected laser gas;
 (e) sealing said housing with the gas therein; and
 (f) supporting the laser gas circulation fan for rotation on a cushion of laser gas.

16. A method according to claim 15, wherein step (a) further includes providing one half of a magnetic coupler in said housing for coupling said circulation fan to an external source of mechanical energy.

* * * * *